United States Patent [19]

Oliver et al.

[11] Patent Number: 5,354,520
[45] Date of Patent: Oct. 11, 1994

[54] PRILL PROCESS

[75] Inventors: Raymond Oliver, Cleveland, England; Ronald O. Peddie, Transvaal, South Africa

[73] Assignees: ICI Chemical Industries PLC, London, United Kingdom; ICI Canada Inc., Canada

[21] Appl. No.: 58,984

[22] Filed: May 5, 1993

[30] Foreign Application Priority Data

May 5, 1992 [GB] United Kingdom ............. 9209621.3

[51] Int. Cl.$^5$ ............................................. C06B 21/00
[52] U.S. Cl. ..................................... 264/3.4; 264/3.6; 149/46; 149/109.6
[58] Field of Search ..................... 264/3.4, 3.6; 149/46, 149/109.6

[56] References Cited

U.S. PATENT DOCUMENTS

| | | | |
|---|---|---|---|
| 4,555,280 | 11/1985 | Levinthal | 149/109.6 |
| 4,585,496 | 4/1986 | Honeyman et al. | 149/21 |
| 4,764,329 | 8/1988 | Lerman | 264/3.5 |
| 4,925,600 | 5/1990 | Hommel et al. | 264/3.4 |
| 5,240,524 | 8/1993 | Chattopadhyay | 149/46 |

*Primary Examiner*—Peter A. Nelson
*Attorney, Agent, or Firm*—Charles Q. Buckwalter, Jr.

[57] ABSTRACT

Explosive grade ammonium nitrate (EGAN) prills are made by a process comprising the steps of:

a. continuously spraying a 95 to 98% by weight solution/melt of ammonium nitrate (or a mixture of ammonium nitrate and minor proportions of one or more other EGAN—acceptable nitrates) in/with water under spray-head conditions causing the emergent jets to break into cascades of substantially mono-sized droplets;

b. allowing the formed droplets to fall within a vertical duct;

c. continuously feeding a stream of cooling gas upwards through the duct to effect cooling and solidification of the falling droplets and some removal of moisture so as to form substantially mono-sized EGAN prills of up to about 4 mm diameter, and d. continuously withdrawing the EGAN prills collecting at the base of the duct (such EGAN prills then optionally being further cooled and/or dried in a forced draught regime), the process also involving intensification of the upward gas flow regime in the duct such that:

(i) the temperature difference of the gas flow between its inlet to the duct and its outlet from the duct is at least about 60° C.; and (ii) the falling velocity of the prills in the duct is at most about 3 meters/second relative to ground (i.e. a stationary observer external to the duct) the upward gas flow velocity being e.g. 6 m/s relative to ground for 2 mm prill and 9 m/s for 3 mm prill and, optionally, (iii) recycling the gas stream after washing and cooling and addition of any required make-up gas.

4 Claims, No Drawings

PRILL PROCESS

This invention concerns ammonium nitrate prill as used in explosive formulations such as ANFO (which is ammonium nitrate (AN) prill containing absorbed fuel oil (FO) at a level of about 6% by weight or higher) and HANFO, or "Heavy ANFO", which is a blend of AN prill (or ANFO) and emulsion explosive.

Explosives grade ammonium nitrate prill (herein "EGAN" prill) is required to be sufficiently porous to be able to absorb the quantity of fuel oil needed for an effective explosives composition. Porosity, which is indicated comparatively by particle density and bulk density, is affected by the conditions of prill formation (especially the initial water content of the spray melt) and the conditions under which the residual small percentage of water (up to 5% by weight) in the collected product at the base of the prill tower is removed by a drying process (down to e.g. 0.1 to 0.2% by weight). The size of EGAN prill is usually around 2 to 3 mm diameter, but larger diameters are not excluded.

In the specification of copending Uk patent application No. 91 24 304.8 a process is described for producing predominantly monosized prills of AN in a prilling tower by a modification of the process described in published EP 0 320 153. The disclosure in UK 91 24 304.8 is as follows:

"It is known from EP-A-0320153 that the disintegration of a liquid jet comprising a highly concentrated solution of ammonium nitrate can be controlled so as to produce a substantially monosize distribution of droplets and hence, on solidification, particles. The disintegration is controlled by causing the plate, wherein an orifice which produces the liquid jet is located, to vibrate at a predetermined frequency and in a plane substantially perpendicular to the direction of flow of the liquid jet, thereby inducing a so-called asymmetric disturbance on the surface of the liquid jet. The vibration is required to have an amplitude which is substantially smaller than that used in other systems wherein the orifice containing plate is vibrated in a plane parallel to the direction of flow of the liquid jet and/or wherein the orifice containing plate is swung from side to side. The predetermined frequency is required to be calculated according to the expression $$f_{OPT} = u_j \cdot (4.5 d_j)^{-1} \quad \ldots (1)$$

wherein $f_{OPT}$ is the frequency in Hertz, $u_j$ is the velocity of the jet from the orifice (m.s$^{-1}$ and $d_j$ is the diameter of the orifice (m). The effect of applying a vibration having the predetermined frequency was confirmed using water, which flow properties are similar to those of a highly concentrated solution of ammonium nitrate, and was successfully applied to the prilling of fertilizer grade ammonium nitrate. It is known in the art that fertilizer grade ammonium nitrate is required to have a high bulk density, and to be relatively non-porous. In order to achieve these desired properties the fertilizer grade ammonium nitrate is produced from a highly concentrated ammonium nitrate solution having an ammonium nitrate concentration of at least 99% by weight, which is known in the art as ammonium nitrate melt or molten ammonium nitrate. Prilling of ammonium nitrate solutions having ammonium nitrate concentrations of less that 99% by weight, e.g. 96% by weight produce a lower density, porous, and physically weaker material which is not as suitable for use as a fertiliser.

It is also known to use ammonium nitrate as an explosive, however, the required characteristics of explosive grade ammonium nitrate are different from those of fertilizer grade ammonium nitrate in that explosive grade ammonium nitrate is required to be relatively porous so that it is able to more readily absorb the various additives and conditioners used to sensitize it to detonation. Thus, in the preparation of explosive grade ammonium nitrate it is required that a solution having a low concentration of ammonium nitrate, i.e. less than 99% w/w, is prilled and the resulting droplets solidified in a generally similar process to that used for preparation of fertilizer grade ammonium nitrate. In the preparation of explosive grade ammonium nitrate is it also desirable to obtain a monosize distribution of particles. Application of asymmetric vibrations to the orifice containing plate at a predetermined frequency calculated according to the method disclosed in EP-A-0 320 153, however, does not lead to the preparation of explosive grade ammonium nitrate comprising particles having a monosize distribution.

It has now been found that prilling of solutions containing low concentrations of ammonium nitrate can be controlled to give monosize distributions of droplets and hence particles by applying vibrations to be orifice containing plate which are of a frequency determined according to an expression which is different from expression (1).

Accordingly the present invention provides a prilling process wherein a liquid comprising between 90 to 98% w/w ammonium nitrate is caused to flow through an orifice in a plate thereby forming a liquid jet and that as the liquid flows through the orifice the plate is vibrated in a plane substantially perpendicular to the direction of the liquid jet thereby producing a asymmetric disturbance to the surface of the liquid jet and the frequency of the vibration at or within 10% of the optimum frequency as given by the expression:

$$f_{OPT} = u_j \cdot (\pi \cdot 20^{0.5} \cdot d_j (1+3z))^{-1} \quad (2)$$

wherein fOPT is the frequency in Hertz, $u_j$ is the velocity of the jet from the orifice (m.s$^{-1}$), $d_j$ is the diameter of the orifice (m), z is the dimensionless group $(We_j) = {}^{0.5} \cdot (Re_j)^{-1}$, $We_j$ is $d_j u_j^2 p.y^1$, $Re_j$ is $d_j u_j p.g^{-1}$, p is the density of the liquid (kg.m$^{-3}$), y is the surface tension of the liquid (N.m$^{-1}$) and g is the viscosity of the liquid (Ns.m$^{-2}$).

One of the differences between the prilling of fertilizer grade ammonium nitrate and explosive grade ammonium nitrate is that the physical properties, in particular the viscosity of the ammonium nitrate solution, influences the hydrodynamics of the droplet formation process thereby preventing the direct use of the expression (1) to determine the optimum frequency of vibration of the orifice containing plate. The viscosity of ammonium nitrate solution is significantly higher than both that of ammonium nitrate melt and also water. Thus, the ammonium nitrate solution is no longer an inviscid liquid, as assumed in derivation of expression (1), but is a viscid liquid the flow properties of which are better described by expression (2). The transition between in viscid and viscid flow is not abrupt. However, where the viscosity of the liquid is less than 1.5 cP (0.0015 Ns.m$^{-2}$) then expression (1) is usually more appropriate, whereas at higher viscosities expression (2) is more appropriate.

The plate used in the prilling process is generally circular in plan view and may also be dished such that the liquid jet issues from the convex side of the plate. Generally each plate contains a plurality of orifices, for example from 2000 to 3000 per plate. Although the vibration of the plate may be through a reciprocating translational movement it is particularly convenient to vibrate the plate through a reciprocating rotational movement wherein the axis of rotation is through the plate, e.g. through the centre of the plate, in a direction generally coincident with the direction of the liquid jet or jets produced.

Where the vibration is through a reciprocating rotational movement it is preferred that the vibration has an amplitude equivalent to $10^{-5}$ to $10^{-3}$ radians of rotation.

The liquid from which explosive grade ammonium nitrate is usually produced comprises a solution containing from 90 to 98% w/w ammonium nitrate, more usually from 92 to 95% w/w ammonium nitrate.

The liquid jet formed by the orifice has a velocity which depends upon the size of the orifice and upon the mass flow rate. The orifice is usually in the form of a circular hole having a diameter from 0.5 to 2 mm, e.g. 0.75, 1.1 or 1.13 mm. In keeping with the teaching of EP-A-0320153 it is also preferred that the flow through the orifice is laminar and uniform flow of the liquid jet is achieved. Similarly, it is preferred that the Reynolds Number does not exceed 2300, and more particularly is in the range from 500 to 2000."

We have now found that when conditions are employed at the spray head that cause the creation of substantially mono-sized "melt" droplets (and hence prills) in a mean size within the practical range 1 to 4 mm, usually in the range 2 to 3 mm, as is the case for the process described in UK Application No. 9124304.8, it is possible to effect a beneficial intensification of the prill forming process.

According to this invention EGAN prills are made by a process that comprises the steps of:
a. continuously spraying a 95 to 98% by weight (preferably 95% to 96% by weight) solution/melt of ammonium nitrate (or a mixture of ammonium nitrate and minor proportions of one or more other EGAN—acceptable nitrates) in/with water under spray-head conditions causing the emergent jets to break into cascades of substantially mono-sized droplets;
b. allowing the formed droplets to fall within a vertical duct;
c. continuously feeding a stream of cooling gas (e.g. ambient air) upwards through the duct to effect cooling and solidification of the falling droplets and some removal of moisture so as to form substantially monosized EGAN prills of up to about 4 mm diameter, say in the range 2 to 3 mm diameter, and
d. continuously withdrawing the EGAN prills collecting at the base of the duct (such EGAN prills then optionally being further cooled and/or dried in a forced draught regime), the process being further characterised by intensification of the upward gas flow regime in the duct such that:
(i) the temperature difference of the gas flow between its inlet to the duct and its outlet from the duct is at least about 60° C. preferably at least about 80° (e.g. up to 20° in and around 100° out); and
(ii) the falling velocity of the prills in the duct is at most about 3, preferably at most about 2, meters/second relative to ground (i.e. a stationary observer external to the duct) the upward gas flow velocity being e.g. 6 m/s relative to ground for 2 mm prill and 9 m/s for 3 mm prill and, optionally,
(iii) recycling the gas stream after washing and cooling and addition of any required make-up gas.

Preferably, the upward gas flow regime in the upper level of the duct at the gas outlet from the duct is such that substantially none of the prills is carried out of the duct in the gas stream. This is made possible in the present process by the creation of substantially uniform composition mono-sized droplets below the spray head. The preferred spray head process is that described above with reference to UK Application No. 91 24 304.8.

In the present process the higher gas velocity within the duct (approaching the terminal falling velocity of the prills) leads to a degree of turbulence in the gas flow enhancing prill drying.

The temperature and high evaporative capacity of the effluent gas (e.g. air) at around ambient humidity makes it useful for performing work in the recycle loop e.g. within a wet scrubbing stage.

A significant economic benefit of the present process are the reduction in the required prilling tower dimensions e.g. the diameter reduced to one third or lower and the height reduced to say, two thirds for the same kg/day prill output, and the reduction in gas circulation loading making possible the economic avoidance of gaseous effluent emissions into the atmosphere.

The present process makes available at the base of the duct EGAN prill containing residual moisture at the same sorts of level as the prior referenced process i.e. preferably 0.1 to 0.5% water by weight. Ordinarily, the as-collected "wet" prill will be further dried in a forced draught regime, conventionally a rotary drum drier.

The melt composition in the present process is preferably an AN/Water melt, aside from any minor inclusions of crystal habit modifiers, anticaking agents and other such property modifiers as already known in the EGAN prior art. Other nitrates are known as additives to AN in explosives applications and their inclusion in the spray melt as a minor component is therefore not excluded on product grounds. Straight forward tests will establish the compatibility of any desired product ingredient with the intensified prill-forming regime of this invention.

We claim:
1. A process for producing explosive grade ammonium nitrate (EGAN) prills which process comprises the steps of:
a. continuously spraying an ammonium nitrate containing liquid, 95 to 98% by weight, selected from the group consisting of a solution containing ammonium nitrate, a melt containing ammonium nitrate and mixtures thereof with minor proportions of at least one other nitrate in/with water under spray-head conditions causing the emergent jets to break into cascades of substantially mono-sized droplets;

b. allowing the formed droplets to fall within a vertical duct;
c. continuously feeding a stream of cooling gas upwards through the duct, thus providing a counter-current flow regime to effect cooling and solidification of the falling droplets and some removal of moisture so as to form substantially mono-sized EGAN prills of up to about 4 mm diameter, and
d. continuously withdrawing the EGAN prills collecting at the base of the duct which are then further cooled and/or dried in a forced draught regime, the process further comprising intensification of the upward gas flow regime in the duct such that:
(i) the temperature difference of the gas flow between its inlet to the duct and its outlet from the duct is at least about 60 C.; and
(ii) the falling velocity of the prills in the duct is at most about 3 meters/second relative to ground (i.e. a stationary observer external to the duct) the upward gas flow velocity being e.g. 6 m/s relative to ground for 2 mm prill and 9 m/s for 3 mm prill and,
(iii) recycling the gas stream after washing and cooling and addition of any required make-up gas.

2. The process of claim 1 wherein the upward gas flow regime in the upper level of the duct at the gas outlet from the duct is such that substantially none of the prills is carried out of the duct in the gas stream.

3. The process of claim 1 wherein the temperature difference of the gas flow between its inlet to the duct and its outlet from the duct is at least about 80° C.

4. The process of claim 1 wherein the falling velocity of the prills in the duct is at most 2 meters/second relative to ground.

* * * * *